United States Patent [19]

Rose, II

[11] 4,158,802

[45] Jun. 19, 1979

[54] RECHARGEABLE BATTERY POWERED ELECTRIC CAR AND RECHARGING STATION THEREFOR

[76] Inventor: William R. Rose, II, 77 Sheridan Rd., Scarsdale, N.Y. 10583

[21] Appl. No.: 864,542

[22] Filed: Dec. 27, 1977

[51] Int. Cl.² .............................................. H02J 7/00
[52] U.S. Cl. ..................................... 320/2; 180/65 R; 307/10 R
[58] Field of Search ....................... 320/2, 56; 307/10; 180/65 R

[56] References Cited

U.S. PATENT DOCUMENTS

| | | | |
|---|---|---|---|
| 691,473 | 1/1902 | Limb | 320/2 X |
| 3,273,038 | 9/1966 | Miller | 320/2 |
| 3,529,229 | 9/1970 | Kennedy | 320/2 |
| 3,596,018 | 7/1971 | Elmes | 320/2 X |
| 3,603,860 | 9/1971 | Johnson | 320/2 |

*Primary Examiner*—Robert J. Hickey

*Attorney, Agent, or Firm*—Holland, Armstrong, Wilkie & Previto

[57] ABSTRACT

A rechargeable battery powered electric vehicle comprising an electric motor powered by a rechargeable storage battery in combination with a recharging station comprising extendible electrodes for supplying recharging power for the vehicle's storage battery, said vehicle comprising a charging circuit connected to said battery with one lead grounded to the vehicle body and one lead connected to a selected portion of an outer surface of the vehicle, said extendible electrodes being positioned in a charging station to extend toward said vehicle with one electrode in contact with the grounded portion of the vehicle and another electrode in contact with the insulated surface connected to said vehicle battery whereby when the vehicle is within reach of the electrodes they make desired contact between the power station and the battery and when the vehicle is moved away from the electrodes the charging connection is broken.

6 Claims, 1 Drawing Figure

U.S. Patent
Jun. 19, 1979
4,158,802
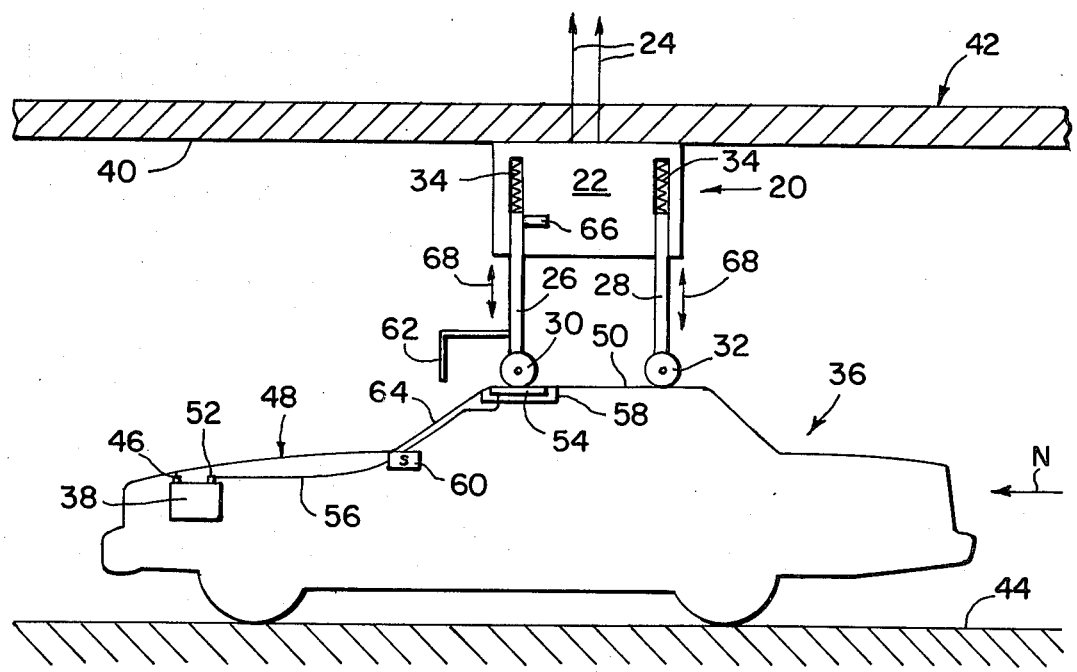

RECHARGEABLE BATTERY POWERED ELECTRIC CAR AND RECHARGING STATION THEREFOR

BACKGROUND OF THE INVENTION

Electric powered vehicles such as electric automobiles, golf carts, and so forth are usually powered by storage batteries for mobility. Eventually the batteries have to be recharged after a certain amount of use. With some types of vehicles, especially electric automobiles, space may be provided in parking lots or garages for the storage of the vehicles overnight. It is an object of this invention to provide a battery recharging system where the vehicle may be driven to a holding means, holding a recharging circuit, and then have the vehicle battery system connected to the recharging circuit merely by positioning the vehicle against electrodes emanating from the recharging apparatus.

Other objects and advantages of the invention will become apparent in the specification below.

DETAILED DESCRIPTION OF THE DRAWINGS

The drawings are set forth in a single FIGURE which is a side elevational diagrammatic view of the invention.

DETAILED DESCRIPTION OF THE INVENTION

The invention comprises a recharging station generally designated by reference numeral 20. Station 20 comprises battery recharging apparatus generally designated by reference numeral 22 which may be connected to a power line 24 for its source of power. The recharging apparatus 22 is provided with a pair of electrodes 26 and 28, each having a connector means such as wheels 30 and 32. The electrodes 26 and 28 are mounted by means of a potential energy device which may operate by gravity or, as in the preferred form of the invention, by means of springs 34. Thus the electrodes 26 and 28 are urged away from the battery apparatus 22 and toward the vehicle 36 which contains the battery 38 to be recharged. The power source station 20 is held by holding means in a position whereby the electrodes 26 and 28 will extend toward the vehicle 36 to be recharged. In the preferred form of invention the holding means could be the ceiling 40 of a structure 42, such as a garage, which is provided with at least one parking space 44 on the floor or a floor of the structure. The vehicle or car 36 is adapted to be placed or parked on the vehicle parking means 44 within range of the extended or extendible electrodes 28 and 28. Thus, the recharge apparatus and its electrodes 26, 28 and connectors 30 and 32 comprise a first portion of the recharge circuit combination of the invention.

A second portion of the recharge circuit combination is comprised in the vehicle 36 and comprises the battery 38 having a first electrode 46 grounded to the frame 48 of the vehicle which, in turn, is grounded to a surface 50 of the vehicle. The second portion of the circuit of the invention continues with a second battery electrode 52 which is connected to an insulated surface portion 54 of the vehicle 36 by means of an insulated conduit 56. Conduit 56 is connected directly to the surface portion 54 which is insulated by insulating material 58. The insulating material 58 can be any suitable type of insulation to insulate surface 54 from surface 50 (as well as the other portions of the vehicle 36).

Switch or circuit breaker means 60 is provided to open the second portion of the battery recharge circuit, as contained within the vehicle 36, in order to prevent possible short circuiting or arcing between adjoining surfaces 54 and 50 of the vehicle 36 which may be connected by an electrical conductor, for example rain water, or the like, during a heavy rain or a piece of debris falling on the vehicle. A switch or circuit breaker 60 is interposed in the circuit at a convenient place along line or conductor 56 so that the operator of the vehicle can make the necessary switching operation or resetting operation when desired.

In the preferred form of the invention the electrodes 26 and 28 are positioned with relation to the parking space 44 so that the vehicle will be lined up longitudinally with the electrodes 26 and 28 when in position for charging, as shown in the FIGURE of the drawings. Thus, the vehicle would be driven into the parking space in the direction of arrow N, as shown in the drawings. The operator moves the vehicle forward until wheel 32 touches the upper surface 50 of the vehicle and then continues to move forward until wheel 30 is positioned in contact with insulated surface 54. At this point the vehicle is stopped and a complete circuit is made for recharging the battery 38 through wheel 30 connected to the insulated surface 54 and through wheel 32 connected to the grounded surface 50. An indicator means 62 may be provided to indicate to the driver of the vehicle when the connector wheels 30 and 32 are in position. The driver can judge from looking at the end of indicator means 62 through his windshield 64 that the wheels 30 and 32 are in proper position. Insulated surface 54 should be made sufficiently long enough so that there would be some area of approximation for making the connections, and also wide enough. The battery may be left in charging condition with the vehicle 36 in parking space 44 and when it is desired to drive the vehicle again, it may either be backed out in an opposite direction to arrow N or, if the parking space is not near a wall, it may be driven forward, again in the same direction as arrow N and away from the charging station 20. Charging station 20 may have, if desired, an automatic switch connected to one of the electrodes indicated at reference numeral 66 to cut off the charging power whenever the electrode becomes fully extended by reason of not being limited in such extension by having the vehicle 36 in place underneath. Double headed arrows 68 indicate the movement of extension of the electrodes 26 and 28.

While the invention has been described in its preferred forms, there are other forms which it may take without departing from the spirit and scope of the invention, and protection is desired for all forms within the claims hereinbelow.

What is claimed is:

1. A power source station comprising electrodes for supplying electric power for recharging rechargeable electric batteries in combination with a vehicle comprising a main body portion including at least one rechargeable electric battery comprising electrodes, characterized in that the power source station is fixed to holding means associated with vehicle parking means and comprises at least one pair of spaced electrodes movably extendible toward said parking means and said vehicle comprises at least one battery recharge circuit portion grounding one battery electrode to the main frame of the vehicle and another battery recharge circuit portion connecting another battery electrode to an insulated surface portion of the vehicle; whereby when the vehicle is moved onto said parking space one of said power source electrodes will be urged into contact with said grounding portion of the vehicle frame and the other of said power source electrodes will be urged into contact with said insulated surface portion of the vehicle.

2. The combination as claimed in claim 1, in which the holding means is a portion of a structure normally above the parking space and the insulated surface portion of the vehicle is positioned at an upper surface of the vehicle.

3. The combination as claimed in claim 1 which comprises switching means in at least one of the battery recharge circuit portions to selectively maintain such circuit portion in an open condition.

4. The combination as claimed in claim 3, in which the switching means is comprised in circuit breaker means.

5. The combination as claimed in claim 2 which further comprises guide means attached to the power station 20 visible through a vehicle windshield for positioning the vehicle with relation to the power source station connected to the structure.

6. The combination as claimed in claim 1, in which the spaced, movably extendible electrodes are associated with springs.

* * * * *